US011637587B2

(12) United States Patent
Chada et al.

(10) Patent No.: US 11,637,587 B2
(45) Date of Patent: Apr. 25, 2023

(54) IN SITU COMMON-MODE NOISE MEASUREMENT IN HIGH-SPEED DATA COMMUNICATION INTERFACES

(71) Applicant: Dell Products L.P., Round Rock, TX (US)

(72) Inventors: Arun Chada, Pflugerville, TX (US); ChunLin Liao, Taipei (TW); Bhyrav Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/388,421

(22) Filed: Jul. 29, 2021

(65) Prior Publication Data

US 2023/0033643 A1 Feb. 2, 2023

(51) Int. Cl.
*H04B 3/46* (2015.01)

(52) U.S. Cl.
CPC .................................... *H04B 3/46* (2013.01)

(58) Field of Classification Search
CPC .......... H04B 3/46; H04B 1/0475; H04B 3/30; H04B 17/00; H04B 15/00
See application file for complete search history.

(56) References Cited

U.S. PATENT DOCUMENTS

| | | | | |
|---|---|---|---|---|
| 5,497,377 | A * | 3/1996 | Muto | H04L 1/24 714/738 |
| 6,823,293 | B2 * | 11/2004 | Chen | G01R 31/31721 324/750.3 |
| 7,337,380 | B2 * | 2/2008 | Chow | G01R 31/31905 714/733 |
| 7,822,110 | B1 * | 10/2010 | Doblar | H04B 3/32 375/224 |
| 8,611,406 | B2 | 12/2013 | Dai et al. | |
| 9,444,588 | B1 * | 9/2016 | Katie | H04L 1/205 |
| 10,693,589 | B2 * | 6/2020 | Nir | H04L 1/0047 |
| 2006/0190793 | A1 * | 8/2006 | Viss | G01R 31/3183 714/738 |
| 2016/0006596 | A1 * | 1/2016 | Dickson | H04L 27/01 375/298 |
| 2017/0262860 | A1 * | 9/2017 | Teplinsky | G06Q 30/0185 |
| 2022/0302942 | A1 * | 9/2022 | Shahramian | H04B 1/1607 |

FOREIGN PATENT DOCUMENTS

EP 2779550 B1 8/2018

* cited by examiner

*Primary Examiner* — Khanh C Tran
(74) *Attorney, Agent, or Firm* — Larson Newman, LLP

(57) ABSTRACT

An information handling system includes a transmitter that transmits data over a channel to a receiver. The transmitter operates to transmit a test sequence including a repeating sequence of a number of logic 1's and the number of logic 0's. The receiver operates to detect noise injected onto the channel based upon an output from a data eye sampler in response to the test sequence.

20 Claims, 3 Drawing Sheets

IN SITU COMMON-MODE NOISE MEASUREMENT IN HIGH-SPEED DATA COMMUNICATION INTERFACES

FIELD OF THE DISCLOSURE

This disclosure generally relates to information handling systems, and more particularly relates to providing in situ common-mode noise measurement in high-speed data communication interfaces for an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a transmitter that transmits data over a channel to a receiver. The receiver may include a data eye sampler. The transmitter may operate to transmit a test sequence including a repeating sequence of a number of logic 1's and the number of logic 0's. The receiver may operate to detect noise injected onto the channel based upon an output from the data eye sampler in response to the test sequence

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
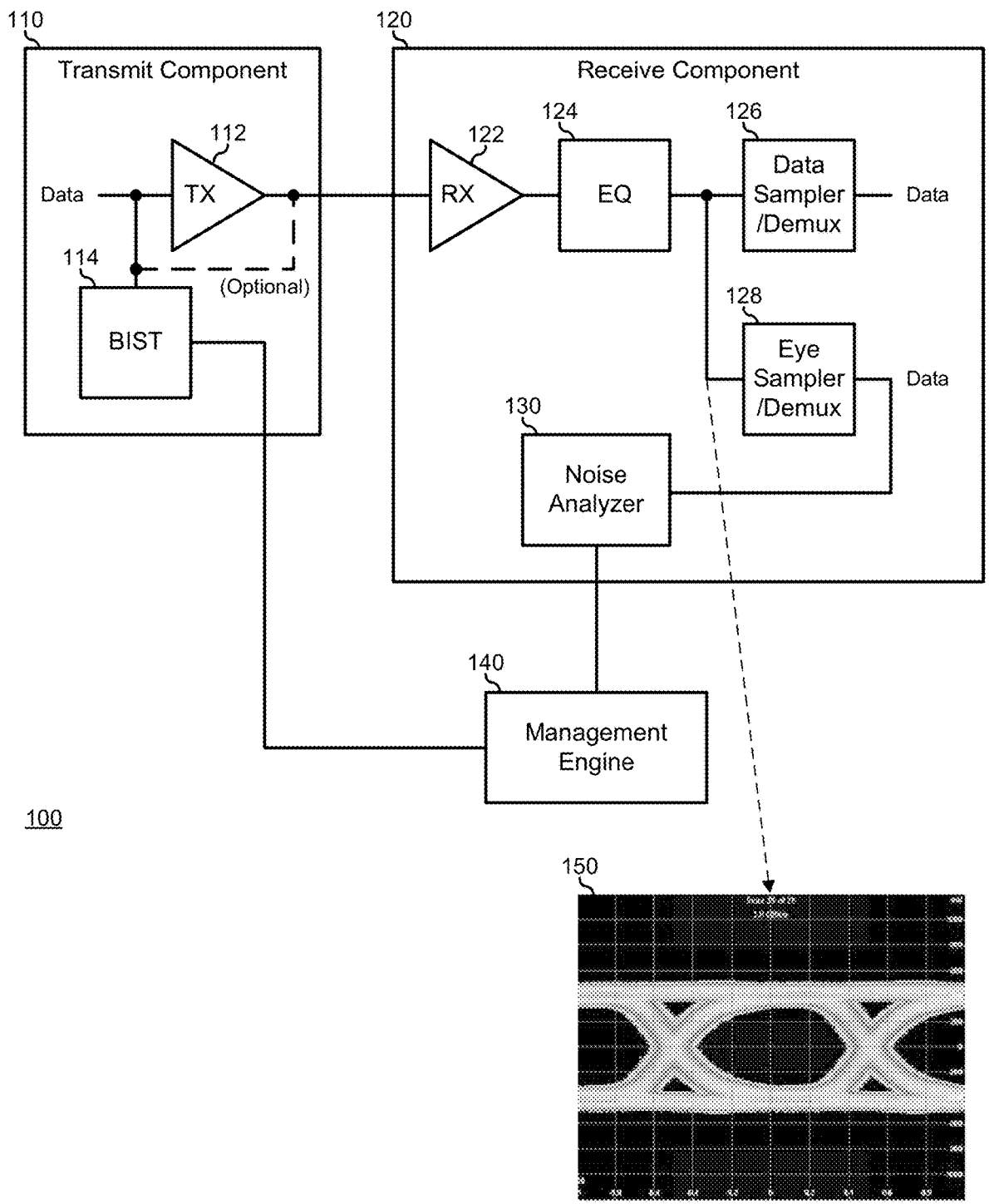
FIG. 1 is a block diagram of an information handling system according to an embodiment of the current disclosure.

FIG. 1 illustrates an information handling system 100 including a data transmitting component 110, a data receiving component 120, and a management engine 140. Data transmitting component 110 (hereinafter "transmitter 110") operates to transmit data via a high-speed data communication interface to and the data is received by data receiving component 120 (hereinafter "receiver 120"). The high-speed data communication interface may be a single-ended data communication interface, as here illustrated, where the data signals are provided over a single conductor and the data values are provided with reference to a common reference voltage, typically a ground level, or the high-speed data communication interface may be a double-ended data communication interface where the data signals are provided as differential signals over a pair of conductors, as needed or desired.

Examples of a high-speed data communication interface include a memory interface, such as a Double-Data Rate (DDR) interface, a Small Form Factor Pluggable (SFP+) interface for network communications, a Serial-ATA interface, a DisplayPort interface, a PCIe interface, a proprietary high-speed data communication interface, or the like. A typical high-speed data communication interface will include elements for bi-directional data communications. Thus, in a first case, a channel between a transmitter and a receiver may be utilized for bi-directional data transfers (for example DDR interfaces). Here, the typical transmitter component may include receive components as described herein that are coupled to the channel, and the typical receiver component may include transmit components as described herein that are coupled to the channel. In another case, a separate channel may be utilized for data transmission from the receiver component to the transmitter component (for example PCIe interfaces). The details of high-speed data communication interfaces are known in the art and will not be further described herein, except as needed to illustrate the current embodiments.

Transmitter 110 includes a physical layer transmitter 112 (hereinafter "transmit PHY 112") and a Built-In Self Test (BIST) module 114. In a normal data transmission operating mode, transmit PHY 112 receives data, and converts the received data into electrical signal on the channel to receiver 120. In some cases, such as in parallel bus type high-speed data communication interfaces, like DDR data communication interfaces, the data conversion may include a bit-by-bit translation of the received data bits into associated signals on the channel. In other cases, such as serial type high-speed data communication interfaces, like PCIe data communication interfaces, the data conversion may include an encoding step, such as an 8-bit/10-bit encoding, to ensure adequate state changes are received in the receiver for clock recovery or the like. The operation of BIST module 114 and an associated noise detection operating mode will be described further below.

Receiver 120 includes a physical layer receiver 122 (hereinafter "receive PHY 122"), an equalization block 124, a data sampler/demultiplexor 126, an eye sampler/demultiplexor 128, and a noise analyzer 130. In the normal operating mode, receive PHY 122 receives the electrical signals from the channel. It will be understood that in a typical high-speed data communication interface, the data stream as provided to transmit PHY 112 is not simply "read" from an output of receive PHY 122. This is because the margins for voltage levels and the time duration of the received signals are so small that the distortion effects from the channel result in a received signal that is typically unrecognizable as data without significant post-processing to recover the data stream. As such, the output from receive PHY 122 is provided to equalization block 124 for processing, and the output of the equalization block is provided to data sampler/demultiplexor 126 before the data stream is recovered.

Equalization block 124 operates to clean up the received signal from receive PHY 122 by compensating for the distortion effects from the channel. The clean signal is provided in the form of a data eye 150. Equalization block 124 may include Automatic Gain Control (AGC) stages, Continuous Time Linear Equalization (CTLE) stages, Decision Feedback Equalization (DFE) stages, or other equalization stages, as needed or desired. Data eye 150 is provided to data sampler/demultiplexor 126 which extracts the data stream from the data eye for use by other elements of receiver 120 as needed or desired. The details of data recovery in a receiver of a high-speed data communication interface are known in the art and will not be further described herein, except as needed to illustrate the current embodiments.

Eye sampler/demultiplexor 128 is similar to data sampler/demultiplexor 126, and receives data eye 150. Here, data eye 150 represents a flow of data bits on the channel, and the depiction of the data eye, as shown in FIG. 1 is an instrument trace of multiple data bits from the data stream. As such, data sampler/demultiplexor 126 is focused upon extracting the individual data bits from the data stream, while data sampler/demultiplexor 128 is focused on the issues of the quality of data eye 150, and particularly on determining the eye height and eye width of the data eye to ensure that sufficient margins are maintained as a result of the equalization process performed by equalization module 124.

In various embodiments, eye sampler/demultiplexor 128 operates in a training mode to provide feedback as to the sufficiency and consistency of the settings of the various stages of equalization block 124 in maintaining adequate margins in data eye 150 to improve the ability of data sampler/demultiplexor 124 to detect the data stream and to reduce the bit error rate of the detection process. In other embodiments, eye sampler/demultiplexor 128 operates in a run time mode to detect changes in data eye 150 and to proactively notify of the changes, or to amend the settings of the various stages of equalization block 124 to maintain bit error rate within satisfactory levels.

It has been understood by the inventors of the current disclosure that, as the speeds of high-speed data communication interfaces increases, and the voltage margins are tightening, that the channels, including on-chip paths in the transmitter and receiver, circuit traces on the printed circuit board, connector interfaces, solder joints, and the like, are becoming more sensitive to noise. On the other hand, traditional methods of testing for susceptibility to noise and for establishing noise margins is becoming more constrained because the data signal at the device boundary, that is, at the device input contact, is not expected to resemble the bit-stream without the post-processing performed by the equalization block. In other words, the introduction of an instrumented interposer and examining the signal trace at the interposer is too far removed from the end of the channel to be of much use. In particular, such noise measurements are very artificial because the interposer is different from the device under test, and in any case, noise sensitivity may be subject to system-to-system variations that make the conclusions drawn on one system inapplicable to other similar systems.

In a particular embodiment, information handling system 100 operates to detect noise on the channel between transmitter 110 and receiver 120. Here, in a noise detection test mode of operation, such as during a Power On Self Test (POST) during a system boot process, BIST module 114 operates to inject a test bit stream into transmit PHY 112, the test bit stream is detected eye sampler/demultiplexor 128, and the detected bit stream is evaluated by noise analyzer 130 to determine if noise is present on the channel. In particular, BIST module 114 operates to sequentially inject a large number of data 0's followed by a large number of data 1's, and repeating the test pattern as needed or desired during the noise detection mode. In this way, the noise detection test signal appears as a low frequency transition from a low state to a high state and back.

For example, BIST module 114 can inject 100 data 0's followed by 100 data 1's. Here, where the high-speed data communication interface has a normal operating frequency of, for example 32 Gigabits per second (Gbps) or 16 Gbps, the noise detection test signal will appear as a 320 Megabits per second (Mbps) or 160 Mbps signal. At such slower speeds, common signal distortion effects as channel loss, reflections, crosstalk, inter-symbol interference, and the like, become negligible, and so the noise on the channel can be detected. Other numbers of data 0's and data 1's may be provided by BIST module 114. In a particular embodiment, BIST module 114 substitutes the noise detection test signal for the data stream, and transmit PHY 112 transmits the noise detection test signal directly. In another embodiment, where transmit PHY 112 provides an encoding function, such as may be common on differential signaling channels, BIST module 114 operates to override the encoding function such that the noise detection test signal is directly transmitted by transmit PHY 112.

In another embodiment, BIST module 114 operates as a time-based and state-based way to inject the noise detection test signal onto the channel. Here, BIST module 114 is coupled directly to an output of transmit PHY 112, and applies a time-based alternating signal at a desired frequency to the output to the channel. Here, the noise detection test signal may be unrelated to a particular number of logic states, and the driving of the channel may be considered to be in an unclocked mode. Here further, management engine 140 may direct receiver 120 to operate in the unclocked mode with respect to any clock based processing, such as clock recovery, and clock phase-locked loop operations, and the like.

Noise analyzer 130 may utilize various methods, such as graphical processing and correlation, digital signal processing, or other processing to evaluate the data to determine the presence or absence of noise on the channel. For example, noise analyzer 130 may compare the data from eye sampler/demultiplexor 128 with a pre-determined sample of a known-good channel, and determine that any variances from the known-good sample represents noise on the channel. In this way, the particular channel is individually evaluated without utilizing external test equipment or other artificial means of noise analysis.

Information handling system 100 includes management engine 140 that is connected to transmitter 110 and to receiver 120 to coordinate the operations of the information handling system in the noise detection test mode. In particular, management engine 140 operates to direct BIST module 114 to transmit the noise detection test signal, and directs noise analyzer 130 to evaluate the data eye from eye sampler/demultiplexor 128 to determine the presence of noise on the channel. Management engine 140 may include hooks into other elements of information handling system 100 to monitor, manage, and maintain the operations of the noise detection test mode.

In a particular embodiment, management engine 140 represents an in-band agent instantiated by a host processor of information handling system 100 that operates during a POST phase and reports the results of the noise analysis by noise analyzer 130 to a BIOS/UEFI of the information handling system, to a user of the information handling system, to an event logger of the information handling system, or the like. in another embodiment, management engine 140 represents an out-of-band element of information handling system 100, such as a Baseboard Management Controller (BMC) or the like, that is connected to a management system (not illustrated) for the information handling system. In a particular embodiment, management engine 140 operates to log the noise performance of the channel for future reference, and then, in subsequent instances of the noise detection test mode, the management engine can compare the noise performance information with past noise performance information to detect changes in the susceptibility of the channel to noise.

Figure 2:
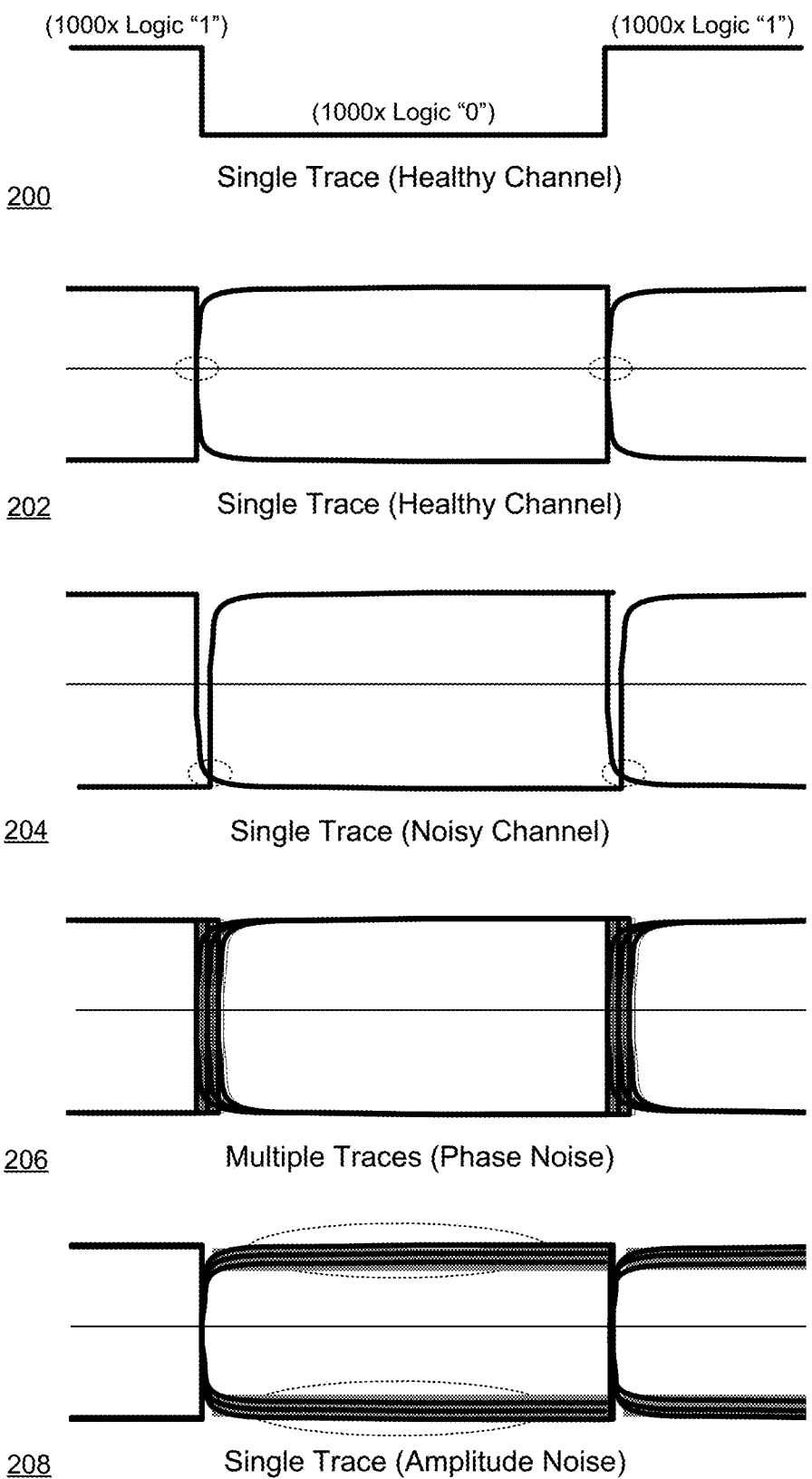
FIG. 2 is a set of signal traces showing various noise characteristics of a channel of the information handling system of FIG. 1.

FIG. 2 illustrates the noise detection test signal 200, here illustrated as a repeating sequence of 1000 logic 1's followed by 1000 logic 0's. Typical trace outputs from an eye sampler/demultiplexor similar to eye sampler/demultiplexor 128 are also shown. In a top trace 202, a single trace is captured of a health channel without noise injected into the channel. The healthy channel is identified as a trace with a positive-to-negative state transition crossover that is situated at the half-voltage level, or, a so-called "even crossing." In a next trace 204, a single trace is captured of a channel that exhibits noise injected into the channel. The noisy channel is identified as a trace with a positive-to-negative state transition crossover that exhibits a time lag, with the crossing being delayed. A related trace 206 shows multiple traces of the phase noise exhibited in trace 204. Here, the noise is indicated by a band of crossover points with a determinable maximum delay. In the bottom trace 208, multiple traces are provided that demonstrate an amplitude noise that is exhibited by a range of voltages for the high and low states.

Figure 3:
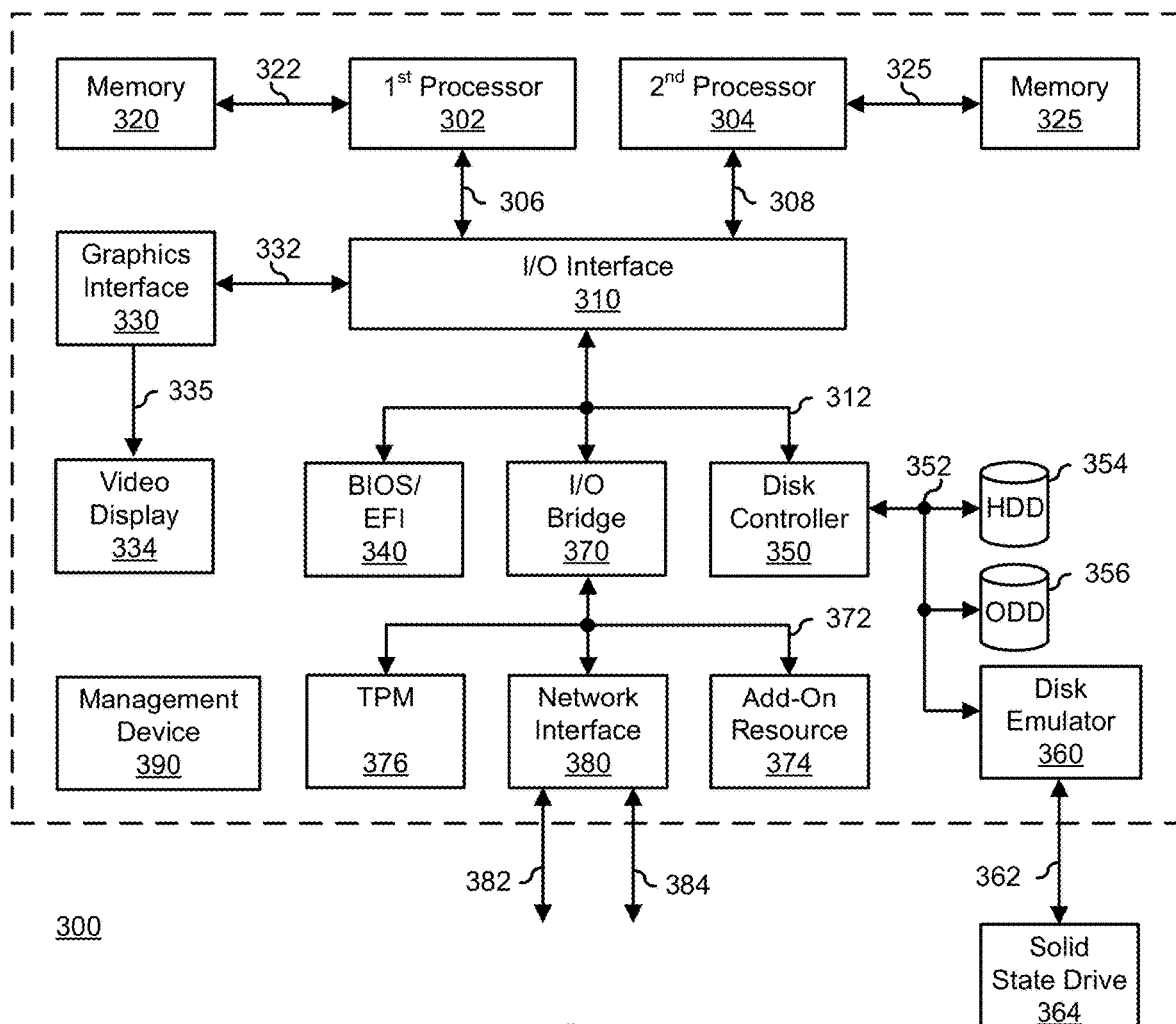
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, and a management device 390. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 335 to a video display 334. In a particular embodiment, information handling system 300 includes separate memories that are dedicated to each of processors 302 and 304 via separate memory interfaces. An example of memories 320 and 325 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a transmitter configured to transmit data over a channel; and
   a receiver configured to receive the transmitted data from the channel, the receiver including a data sampler and an eye sampler;
   wherein the transmitter operates in a normal operating mode to transmit user data and in a test mode to transmit a test sequence including a sequence of a number (N) of consecutive logic 1's and the number (N) of consecutive logic 0's, the sequence being transmitted repeatedly, thereby lowering an apparent frequency of the test sequence to minimize channel loss, reflections, crosstalk, and inter-symbol interference in the test sequence; and wherein the receiver operates in the normal operating mode to receive the user data with the data sampler, and in the test mode to detect noise injected onto the channel based upon an output from the data eye sampler in response to the test sequence with the eye sampler.

2. The information handling system of claim 1, wherein the transmitter includes a Built-In Self Test module configured to provide the test sequence during a noise detection test mode.

3. The information handling system of claim 2, wherein the test module provides the test sequence during a Power-On Self Test (POST) stage of operation of the information handling system.

4. The information handling system of claim 2, wherein, in a normal operation mode, the transmitter operates to encode data received by the transmitter into an encoded bit stream on the channel, and wherein, in the noise detection test mode, the transmitter operates to provide the test sequence onto the channel without encoding.

5. The information handling system of claim 2, wherein the test module provides the test sequence directly to the channel.

6. The information handling system of claim 1, wherein the detected noise includes phase-based noise.

7. The information handling system of claim 6, wherein the phase-based noise is detected based upon a crossover point of detected signal transitions.

8. The information handling system of claim 1, wherein the detected noise includes amplitude-based noise.

9. The information handling system of claim 8, wherein the amplitude-based noise is detected based upon a settling voltage level of the detected signal.

10. The information handling system of claim 1, wherein the number is equal to 100.

11. A method, comprising:
transmitting, in a test mode, by a transmitter of an information handling system, a test sequence including a sequence of a number (N) of consecutive logic 1's and the number (N) of consecutive logic 0's over a channel, the sequence being transmitted repeatedly, thereby lowering an apparent frequency of the test sequence to minimize channel loss, reflections, crosstalk, and inter-symbol interference in the test sequence;
receiving, in the test mode by the receiver, the test sequence;
providing, in the test mode, the test sequence to a eye sampler of the receiver; and
detecting, by the eye sampler, noise injected onto the channel based upon an output from the data eye sampler in response to the test sequence;
transmitting, in a normal operating mode, by the transmitter, user data;
receiving, in the normal operating mode by the receiver, the user data; and
providing, in the normal operating mode, the user data to a data sampler of the receiver.

12. The method of claim 11, wherein the transmitter includes a Built-In Self Test module configured to provide the test sequence during a noise detection test mode.

13. The method of claim 12, further comprising providing the test sequence during a Power-On Self Test (POST) stage of operation of the information handling system.

14. The method of claim 12, further comprising:
encoding, by the transmitter in a normal operation mode, data received by the transmitter into an encoded bit stream on the channel; and
providing, by the transmitter in the noise detection test mode, the test sequence onto the channel without encoding.

15. The method of claim 12, further comprising providing the test sequence directly to the channel.

16. The method of claim 11, wherein the detected noise includes phase-based noise.

17. The information handling method of claim 16, wherein the phase-based noise is detected based upon a crossover point of detected signal transitions.

18. The method of claim 11, wherein the detected noise includes amplitude-based noise.

19. The method of claim 18, wherein the amplitude-based noise is detected based upon a settling voltage level of the detected signal.

20. An information handling system, comprising:
a receiver configured to receive data from a transmitter over a channel, the receiver including a data sampler and an eye sampler, wherein the transmitter operates in a noise test mode to transmit a test sequence including a sequence of a number (N) of consecutive logic 1's and the number (N) of consecutive logic 0's, the sequence being transmitted repeatedly, thereby lowering an apparent frequency of the test sequence to minimize channel loss, reflections, crosstalk, and inter-symbol interference in the test sequence, wherein the receiver operates in the noise test mode to detect noise injected onto the channel based upon an output from the data eye sampler in response to the test sequence, wherein the transmitter operates in a normal operating mode to transmit user data, and wherein the receiver operates in the normal operating mode to provide the user data to the data sampler; and
a management engine configured to set the transmitter and the receiver into the noise test mode.

* * * * *